United States Patent [19]

Hayashi

[11] 3,798,364

[45] Mar. 19, 1974

[54] VIDEO SIGNAL REPRODUCING SYSTEM

[75] Inventor: Hiroyuki Hayashi, Tokyo, Japan

[73] Assignee: Sony Corporation, Tokyo, Japan

[22] Filed: Dec. 7, 1971

[21] Appl. No.: 205,529

[30] Foreign Application Priority Data

Dec. 11, 1970 Japan ............................ 45-110879

[52] U.S. Cl...... 178/6.6 DC, 178/6.6 A, 178/6.6 TC

[51] Int. Cl. .......................... H04n 5/21, H04n 5/78

[58] Field of Search....... 178/6.6 A, 6.6 DC, 6.6 TC

[56] References Cited

UNITED STATES PATENTS

| | | | |
|---|---|---|---|
| 3,328,521 | 6/1967 | Moskovitz | 178/6.6 DC |
| 3,197,559 | 7/1965 | Kihara | 178/6.6 A |
| 3,366,732 | 1/1968 | Holmberg | 178/6.6 DC |

*Primary Examiner*—James W. Moffitt

*Attorney, Agent, or Firm*—Lewis H. Eslinger, Esq.; Alvin Sinderbrand, Esq.

[57] ABSTRACT

In a reproducing system for a video signal recorded on a magnetic medium, which is provided with a dropout compensator for compensating a dropout in the reproduced video signal, the dropout compensator including a gate means which is operative to prevent dropout compensation in the case of a dropout occurring in the vicinity of the vertical synchronizing signal.

3 Claims, 7 Drawing Figures

PATENTED MAR 19 1974 3,798,364

SHEET 1 OF 2

INVENTOR

HIROYUKI HAYASHI

INVENTOR
HIROYUKI HAYASHI

VIDEO SIGNAL REPRODUCING SYSTEM

BACKGROUND OF THE INVENTION

1. Field of the Invention

This invention relates to a video signal reproducing system, and more particularly to a video signal reproducing system provided with a dropout compensator for compensating for a dropout occurring in the video signal during reproducing.

2. Description of the Prior Art

While recording a signal on a magnetic tape or reproducing it therefrom, a bad contact of the tape with a magnetic head causes a momentary break in the reproduced signal. This is commonly referred to as a dropout. During reproduction of a video signal from the magnetic tape the dropout produces random black and white streaks or flashes in the reproduced picture to deteriorate its quality.

To avoid this, a dropout compensator has heretofore been employed which is designed utilizing the fact that no appreciable difference exists in the information content of adjacent horizontal scanning lines. In the prior dropout compensator the reproduced video signal of each horizontal scanning period is delayed for one horizontal line period, and when a dropout occurs in the original reproduced signal, the dropout portion is replaced with the delayed video signal of a preceding horizontal scanning line, thereby to compensate for the dropout.

With such a conventional dropout compensator, however, the reproduced picture on the screen sometimes moves up and down. This phenomenon can be explained as follows. An electric switch is employed for switching from the non-delayed signal to the delayed signal and vice versa for compensating the dropout. Therefore, at the time of actuation of the electric switch a noise is thereby produced transiently in a signal transmitter. Thus, when a dropout occurs in close proximity to the upper or lower edge of the reproduced picture, especially to the lower edge, the noise produced by the transient phenomenon of the switching operation exists in close proximity to the vertical synchronizing signal, with the result that the vertical synchronization becomes out of step and causes vertical fluctuation of the reproduced picture.

SUMMARY OF THE INVENTION

This invention is directed to a magnetic video recording and reproducing device provided with a dropout compensator which is designed to stop its function in response to a dropout occurring in the video signal in close proximity to a vertical synchronizing signal contained therein.

Accordingly, one object of this invention is to provide an improved magnetic video recording and reproducing device which is free from the aforementioned defects experienced in the prior art.

Another object of this invention is to provide a magnetic recording and reproducing device in which a dropout in the video signal is compensated by a dropout compensator.

Still another object of this invention is to provide a magnetic video recording and reproducing device in which fluctuation of the reproduced picture due to the operation of a dropout compensator is avoided by the provision of simple subsidiary equipment in the dropout compensator.

Other objects, features and advantages of this invention will become apparent from the following description taken in conjunction with the accompanying drawings.

DESCRIPTION OF THE PREFERRED EMBODIMENTS

Figure 1:
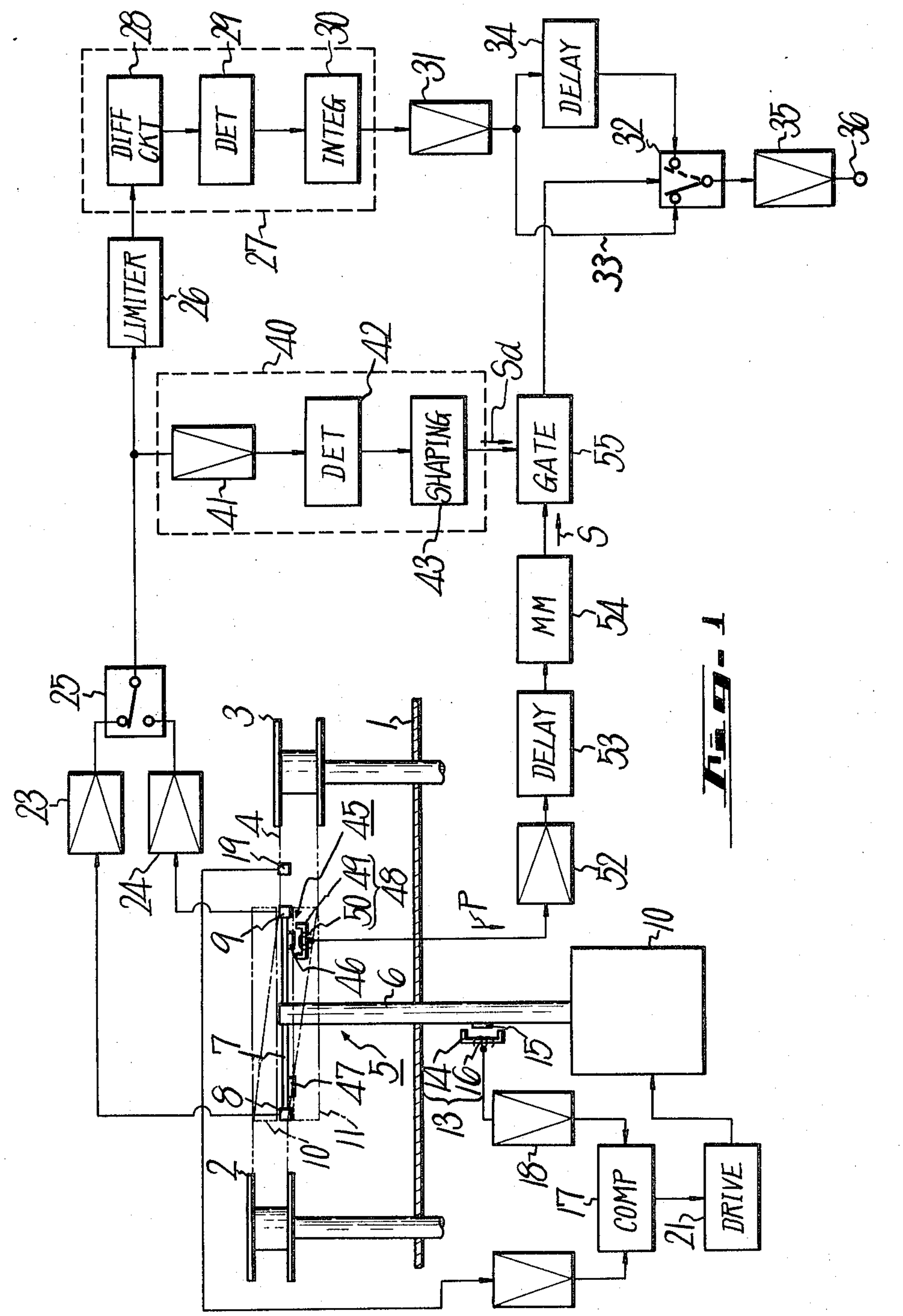
FIG. 1 is a block diagram showing one example of a magnetic recording and reproducing device employing a dropout compensator circuit of this invention.

With reference to the drawings one embodiment of this invention will be described. Reference numeral 1 indicates a base plate on which are mounted supply and take-up reels 2 and 3 between which a magnetic tape 4 is driven. On the base plate 1 there is also mounted a rotary magnetic head assembly 5 along the tape path.

In the rotary magnetic head assembly 5 magnetic heads 8 and 9 are attached to the periphery of a rotary plate 7 affixed to a rotary shaft 6, the heads being spaced apart an angular distance of about 180 degrees, and magnetic tape guide drums 10 and 11 are located above and below the plane of rotation of the rotary magnetic heads 8 and 9 respectively. As is well-known, the magnetic tape 4 paid out from the supply reel 2 is transported while being obliquely directed around the tape guide drums over an angular range greater than 180°. Further, the rotary shaft 6 is driven by a motor 22 at a speed of 30 rps.

A rotation detecting means provided around the rotary shaft 6, comprises a magnetic head 13 consisting of a magnetic yoke 14 and a coil 16 wound thereon and a magnetic piece 15 affixed to the rotary shaft 6. A pulse signal which corresponds to the speed and phase of rotation of the rotary shaft 6 is available from the coil 16 of the magnetic head 13. Thus, the rotation detecting means 12 is formed with the magnetic piece 15 and the magnetic head 13.

The pulse signal thus obtained is supplied to a phase comparator circuit 17 through an amplifier 18 which is also supplied with a control signal derived from the magnetic tape 4. The control signal is recorded on the magnetic tape 4 by a magnetic head 19 located between the tape guide drums 10 and 11 and the take-up reel 3 during recording in a known manner, and the control signal may be used as a vertical synchronizing signal in the video signal. During reproducing, the control signal, which corresponds to the vertical synchronizing signal, is reproduced by the magnetic head 19 and supplied to the phase comparator circuit 17 through an amplifier 20. Thus, the phase comparator circuit 17 provides a phase-comparision signal which is obtained by the phase comparison of the pulse signal resulting from the rotation of the rotary shaft 6 with the control signal reproduced by the magnetic head 19. The phasecomparison signal thus obtained is supplied to a drive control circuit 21 for the motor 22 to control it to drive the rotary shaft 6 at a predetermined speed, as is well-known.

Further, during recording, a video signal including horizontal and vertical synchronizing signals is recorded on the magnetic tape 4 by the magnetic heads 8 and 9 alternately.

During reproducing video signals reproduced by the magnetic heads 8 and 9 are amplified by preamplifier circuits 23 and 24 respectively, the outputs from which are applied to a switching means 25 and then alternately supplied to a demodulator circuit 27 through a limiter 26 in a known manner. The demodulator circuit 27 is used for demodulating the video signal when it is recorded after being frequency-modulated. The demodulator circuit 27 consists of, for example, a differentiation circuit 28, a detector circuit 29 and an integrator circuit 30. The circuit 27 is of a pulse-count type, in which the output of the limiter 26 is differentiated by the differentiation circuit 28, the differentiated output therefrom is full-rectified by the detector circuit 29 and the full-rectified output therefrom is integrated by the integrator circuit 30 to derive a video signal at its output side.

The video signal thus demodulated is amplified by an amplifier circuit 31 and directly supplied through a line 33 to a switching means 32 which is controlled by the output signal of a dropout detector, to be described later, while being supplied to the switching means 32 through a delay means, for example, a delay line 34 having a delay time of one H (one horizontal line period). Under normal conditions, the switching means 32 is adapted to supply the output from the amplifier 31 to an amplifier circuit 35, which has an output terminal 36. However, when an output detecting signal, which will be described hereinafter, is generated, the switching means 32 is actuated to supply the output from the delay line 34 to the amplifier 35. The switches, 32 and 25 are both electronic switches.

One portion of the output from the aforementioned switching means 25 is supplied to a dropout detector circuit 40, by which a dropout in the video signal is detected. In the present invention the dropout detector circuit 40 is made up of an amplifier circuit 41, an envelope detector circuit 42 and a waveform shaping circuit 43. The output from the dropout detector circuit 40, that is, the dropout detecting signal, is applied to the switching means 32 to control it to achieve dropout compensation as previously described.

In the present invention a control signal is produced whose duration is longer than that of the vertical synchronizing signal contained in the reproduced video signal and the switching means 32 is designed to be inactive for the duration of the control signal.

Figures 2A, 2B, 2C, 2D:
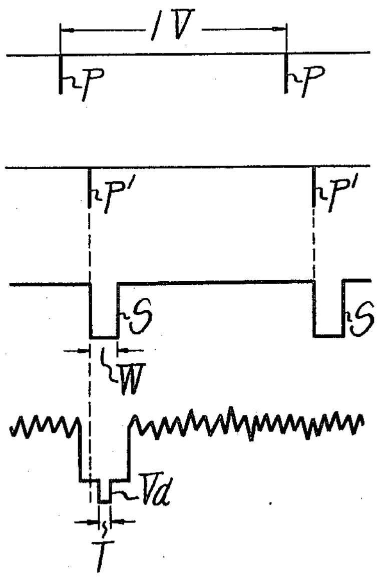
FIGS. 2A–D and 3A and 3B are waveform diagrams, for explaining the operation of the device of FIG. 1.

For this purpose, a pulse generator means 45 is provided which produces two pulses per one rotation of the rotary shaft 6 to control the signal derived from the detector circuit 40. The pulse generator means 45 is made up of a pair of magnets or magnetic pieces 46 and 47 mounted 180° apart on the rotary plate 7 on the same circumference about the shaft 6 and a magnetic head 48 disposed on the circular locus of the magnets in opposing relation to them, the head 48 consisting of a yoke 49 and a coil 50 wound thereon. Accordingly, the pulse generator means 45 produces a pulse P, such as is depicted in FIG. 2A, which has a repetitive frequency of 60 Hz. The pulse signal P is amplified by an amplifier circuit 52 and supplied to a variable signal delay circuit 53 to provide a pulse P′, such as is shown in FIG. 2B. The pulse signal P′ is applied to a monostable multivibrator 54 to derive on its output side a gate signal S, such as is shown in FIG. 2C, which has a width W. The gate signal S is fed to a gate circuit 55 provided on the output side of the dropout detector circuit 40. In this case, it should be noted that the width W of the gate signal S derived from the monostable multivibrator 54 is selected to exceed that of the vertical synchronizing signal Vd contained in the video signal reproduced by each of the rotary heads 8 and 9. Further, the time of generation of the pulse P′ depicted in FIG. 2B is selected by the variable delay circuit 53 to be immediately before the vertical synchronizing signal Vd.

Figures 3A, 3B:
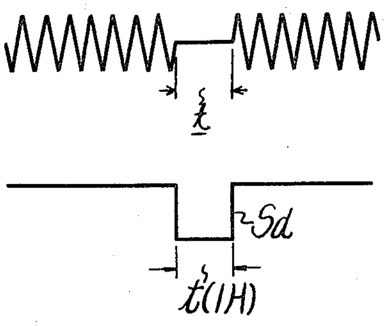

With the arrangement described above, the switching means 32 is normally in the condition indicated by a full line, so that the signals reproduced by the magnetic heads 8 and 9 are applied through the switching means 25 and the limiter 26 to the demodulator circuit 27 to be demodulated. The demodulated signal is derived at the output terminal 36 through the amplifier circuit 31, the switching means 32 and the amplifier circuit 35. In this case, when a dropout occurs in the signal reproduced by the magnetic heads 8 and 9 (shown in FIG. 3A) for a period of time $t$, for example, one horizontal line period in the absence of the signal S of FIG. 2C, a signal Sd depicted in FIG. 3B is derived on the output side of the dropout detector circuit 40 and applied through the gate circuit 55 to the switching means 32 to change it over as indicated by a broken line. As a result of this, for this period of time $t$ the reproduced signal having passed through the delay line 34 is derived at the output terminal, and accordingly a signal without any dropout is obtained at the output terminal 36.

In the event that the aforementioned dropout occurs in the period W of the signal S shown in FIG. 2C, that is, in the vicinity of the vertical synchronizing signal, the signal from the dropout detector circuit 40 is not fed to the switching means 32 because the gate circuit 55 is held by the signal S in its cutoff condition as previously described. Therefore, the switching means 32 remains in the condition indicated by a solid line and no dropout compensation is achieved.

As above described, even if a dropout occurs in the neighborhood of the vertical signal, no dropout compensation is achieved, so that the vertical synchronizing signal is not disturbed by a noise which is generated by switching of the switching means and fluctuation of the reproduced picture can be avoided. Further, since the dropout in this case occurs in the vertical blanking period, it is not likely to appear in the reproduced picture, and accordingly the reproduced picture remains unchanged.

In the foregoing the gate signal S is produced in association with the rotation of the rotary magnetic heads. However, the gate signal may also be obtained by a method which delays a control signal recorded on the magnetic tape to a time immediately prior to the generation of the vertical synchronizing signal and derives from the gate signal from the delayed signal, a method which previously records an independent gate signal on the tape and uses it during reproducing, a method which requires an oscillator synchronized with the vertical synchronizing signal and having a phase a little advanced from the synchronizing signal and produces the gate signal from a signal derived from the oscillator and other methods.

It will be apparent that many modifications and variations may be effected without departing from the scope of the novel concepts of this invention.

I claim as my invention:

1. A reproducing system for a video signal recorded on a recording medium, the system comprising:

A. constant speed rotating means for driving said recording medium at a speed commensurate with the vertical synchronizing frequency of said video signal;

B. means for transmitting a reproduced video signal;

C. means connected to the transmitting means for detecting a dropout in the reproduced video signal;

D. means connected to said transmitting means for generating a compensating video signal;

E. compensating means connected to the transmitting means and to said compensating signal generating means for compensating the reproduced video signal by means of the compensating video signal in response to an output signal derived from the dropout detecting means when a dropout occurs in the reproduced video signal; and F. prevention means synchronously operated with respect to vertical synchronizing signals and connected to prevent dropout compensation when the dropout occurs in the proximity of a vertical synchronizing signal, said prevention means comprising:

1. means to generate from said rotating means a constant frequency signal at the same frequency as said vertical synchronizing frequency, 2. a gate actuated by said dropout detecting means to actuate said compensating means, and 3. means connected to said constant frequency generating means to be controlled thereby to produce a gate control signal having a starting time in advance of each vertical synchronizing signal and lasting until the end of said vertical synchronizing signal, said last-named means being connected to said gate to disable said gate in response to said gate control signal.

2. A reproducing system as claimed in claim 1, wherein said compensating signal generating means comprises delay means for delaying the undelayed video signal for at least substantially one horizontal line period, and said compensating means comprises switching means connected to said transmitting means to receive the undelayed video signal therefrom and connected to said delay means to receive the compensating signal therefrom, said switching means being connected to said gate means to be controlled thereby to pass, selectively, said undelayed video signal or said compensating signal except in the proximity of vertical synchronizing signals.

3. A reproducing system as claimed in claim 1, comprising, in addition, delay means for controlling the timing of the signal from the means to generate a constant frequency signal, said delay means being connected between the constant frequency generating means and the gate control signal producing means.

* * * * *